United States Patent
Feng et al.

(10) Patent No.: US 6,339,815 B1
(45) Date of Patent: *Jan. 15, 2002

(54) MICROCONTROLLER SYSTEM HAVING ALLOCATION CIRCUITRY TO SELECTIVELY ALLOCATE AND/OR HIDE PORTIONS OF A PROGRAM MEMORY ADDRESS SPACE

(75) Inventors: Eugene Feng; Gary Phillips, both of San Jose, CA (US)

(73) Assignee: Silicon Storage Technology, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,242

(22) Filed: Aug. 14, 1998

(51) Int. Cl.[7] .......................... G06F 13/00; G06F 13/20
(52) U.S. Cl. .......................... 711/163; 711/152; 712/43
(58) Field of Search .................. 713/200, 201, 713/300, 193, 2; 709/244; 711/154, 163, 115, 158, 170, 103, 101, 164, 152; 712/43; 365/218; 703/123; 235/380, 382.5, 492; 714/30

(56) References Cited

U.S. PATENT DOCUMENTS

| | | | | |
|---|---|---|---|---|
| 5,014,191 A | | 5/1991 | Padgaonkar et al. | 711/163 |
| 5,067,077 A | * | 11/1991 | Wakimoto et al. | 711/163 |
| 5,251,304 A | | 10/1993 | Sibigtroth et al. | 712/200 |
| 5,432,950 A | * | 7/1995 | Sibigtroth | 711/163 |
| 5,452,431 A | * | 9/1995 | Bournas | 711/115 |
| 5,465,341 A | * | 11/1995 | Doi et al. | 714/30 |
| 5,515,540 A | * | 5/1996 | Grider et al. | 713/200 |
| 5,557,743 A | * | 9/1996 | Pombo et al. | 713/200 |
| 5,737,760 A | * | 4/1998 | Grimmer, Jr. et al. | 711/163 |
| 5,809,544 A | * | 9/1998 | Dorsey et al. | 711/163 |
| 5,903,912 A | * | 5/1999 | Hansen | 711/154 |
| 5,911,778 A | * | 6/1999 | Garnett | 713/200 |
| 5,930,826 A | * | 7/1999 | Lee et al. | 711/163 |
| 5,954,818 A | * | 9/1999 | Dalvi et al. | 713/200 |
| 6,076,149 A | * | 6/2000 | Usami et al. | 711/149 |

OTHER PUBLICATIONS

"P83CE558/P80CE558/P89CE558 Single–chip 8–bit microcontroller", Preliminary Specification IC20 Data Handbook, Phillips Semiconductors, Aug. 6, 1996.

* cited by examiner

Primary Examiner—Zarni Maung
Assistant Examiner—Jungwon Chang
(74) Attorney, Agent, or Firm—Gray Cary Ware & Freidenrich LLP

(57) ABSTRACT

A microcontroller system has a first and a second block of non-volatile programmable memory and includes a program memory space allocation circuitry. In a first mode of operation, the first and second blocks of programmable memory are prevented from being written by commands external to the microcontroller system. In a second mode, however, the first and second blocks of programmable memory are prevented from being written by commands external to the microcontroller system but the second block of programmable memory can be written based upon execution of commands stored in the first block of programmable memory. By having circuitry to so allocate the programmable memories, the security of the programmable memories is enhanced.

11 Claims, 4 Drawing Sheets

| SEC BYTE | SFCF (6:5) | EA# | BLK SEL | BLOCK ERASE | SECTOR ERASE | WRITE BYTE | BURST WRITE | VERIFY BYTE | DESCRIPTION |
|---|---|---|---|---|---|---|---|---|---|
| FF | 00 | X | X | Y | Y | Y | Y | Y | NO LOCK |
| 55 | 11 | X | X | N | N | N | N | N | BOTH LOCKED |
| F5 | 01 | X | 0 | Y | Y | Y | Y | Y | ONLY BLOCK 1 (4KB) IS LOCKED |
|  |  | X | 1 | N | N | N | N | N |  |
|  |  | 0 | 0 | N | N | N | N | N |  |
| 05 | 10 | 0 | 0 | N | N | N | N | N | BOTH LOCKED BUT BLOCK 0 IS PROGRAMMABLE BY SOFTWARE CODE RESIDED IN BLOCK 1 |
|  |  | 1 | 0 | Y | Y | Y | Y | Y |  |

NOTE: SECBYTE = VALUE OF SECURITY BYTE AT LOCATION FFFFh; SFCF (6:5) = BIT 5 AND 6 OF SFCF REGISTER; EA# = EXT. ACCSS ENABLE INPUT PIN;1 = RUNNING CODE FROM INTERNAL MEMORY, 0 = RUNNING CODE FROM EXTERNAL ENABLE; BLKSEL= BLOCK SELECT SIGNAL (INTERNAL): 1 = BLOCK 1 (4Kx8), 0 = BLOCK 0 (32 Kx8); X = DONT CARE; Y = COMMAND ALLOWED; N = COMMAND NOT ALLOWED

FIG. 3A

INTERNAL AND EXTERNAL PROGRAM MEMORY ACCESS WITH SECURITY LOCK ACTIVATED (THE VALUE OF THE SECURITY BYTE IS NEITHER 00h NOR FFh).

| INSTRUCTIONS | ACCESS TO LOCKED PROGRAM MEMORY | ACCESS TO UNLOCKED OR EXTERNAL PROGRAM MEMORY |
|---|---|---|
| MOVC IN LOCKED PROGRAM MEMORY | YES | YES |
| MOVC IN UNLOCKED OR EXTERNAL PROGRAM MEMORY | NO | YES |

FIG. 3B

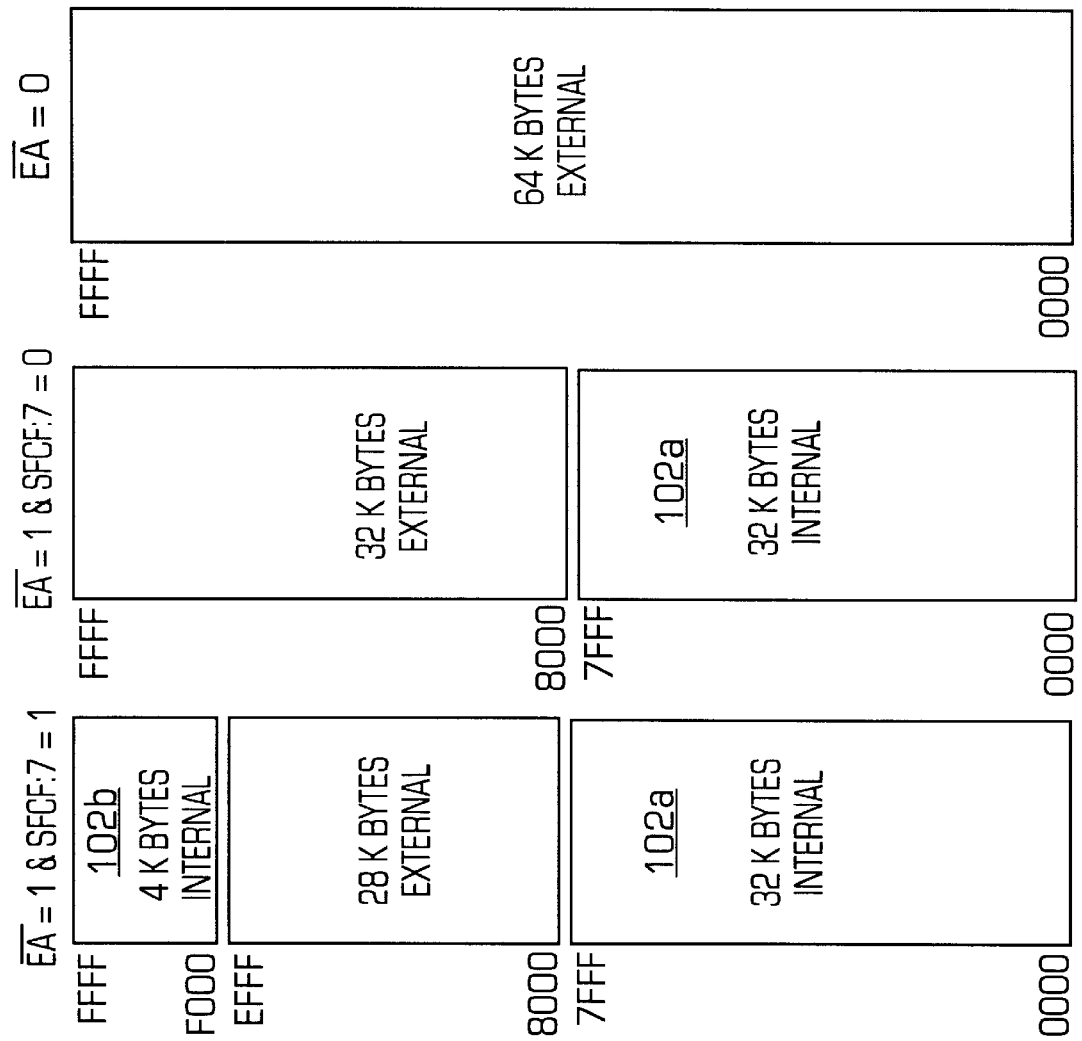

MICROCONTROLLER SYSTEM HAVING ALLOCATION CIRCUITRY TO SELECTIVELY ALLOCATE AND/OR HIDE PORTIONS OF A PROGRAM MEMORY ADDRESS SPACE

TECHNICAL FIELD

The present invention relates to microcontroller systems having flash memory in a program memory address space and, in particular, to a microcontroller system that selectively allocates portions of the program memory space to either internal or external memories, or a combination thereof, for reasons of security of the internal memory contents.

BACKGROUND

Microcontroller systems including memory are known in the art. With a conventional microcontroller system, blocks of the memory may be locked such that a locked block cannot be interrogated. This locking thus secures program code contained in the locked blocks from unauthorized access by firmware piraters and from accidental erasing and programming.

However, conventionally, neither can the locked blocks be conveniently reprogrammed or accessed by an authorized user. It is desirable for a microcontroller system to be configurable such that blocks of memory ca be locked from unauthorized interrogation or code corruption, but can also be reprogrammed and/or accessed under a predetermined secure environment.

SUMMARY

In accordance with the present invention, a microcontroller system includes program memory space allocation means. In a first mode of operation, a first block of program memory is hidden for code fetching such that a processor is prohibited from retrieving program instructions from the first block of program memory. In a second mode, however, the first block of program memory is accessible for code fetching. In a third mode of operation, the program memory space allocation means allocates the program memory space such that the processor may retrieve program instructions only from an external memory, that is not unitarily formed in the integrated circuit. In some embodiments, the mode of operation of the program memory space allocation is controlled in response to the contents of a configuration register.

By having means to so allocate the program memory, the security of the program memory is enhanced.

BRIEF DESCRIPTION OF THE DRAWINGS

FIG. 3A is a table that summarizes security functions of the FIG. 1 microcontroller system.

FIG. 3B is a table that further details the activated mode of the security lock circuit.

FIGS. 4A to 4C illustrate various states of program memory organization of the FIG. 1 microcontroller system.

DETAILED DESCRIPTION

Figure 1:
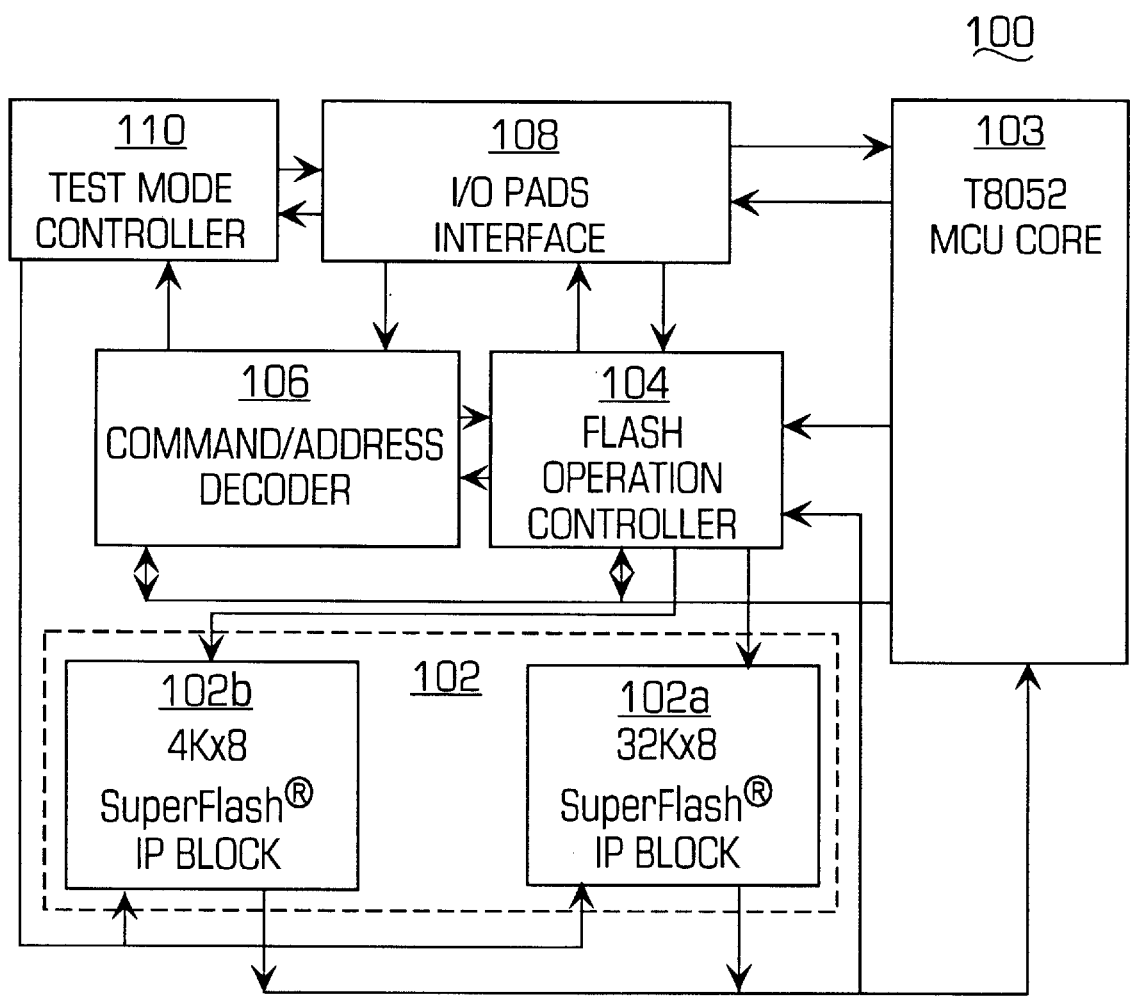
FIG. 1 is a block functional illustration of an embodiment of a microcontroller system.

FIG. 1 illustrates, in block functional form, a microcontroller system 100 in accordance with an embodiment of the present invention, unitarily formed in an integrated circuit. The system 100 includes a microcontroller unit (MCU) core 103, designated by part number T8052 in FIG. 1. In the described (preferred) embodiment, the microcontroller system 100 is compatible with standard 8×C58 microcontroller devices.

Embedded program memory 102 includes two independent program memory blocks 102a and 102b. The program memory blocks 102a and 102b are erasable and reprogrammable, and are preferably flash EEPROM of the type disclosed, for example, in U.S. Pat. No. 5,572,054, issued Nov. 5, 1996 and assigned to Silicon Storage Technology, Inc. of Sunnyvale, Calif., the assignee of the present patent application. Program memory block 102a (designated, for convenience of reference, as the "lower program block") is addressable at the standard 87C58 32 Kbytes of internal ROM area, and program memory block 102b (designated for convenience of reference as the "upper program memory block") is addressable at the high address end of the 8×C5× architecture. In addition, the microcontroller system 100 is configurable to address up to 64 Kbytes of program memory (not shown) external to the system 100. The system 100 also includes on-chip RAM (not shown) and is configurable to address external data RAM (not shown).

A flash operation controller 104 (shown in more detail in FIG. 2, discussed later) includes circuitry for controlling access to and from the program flash memory 102. A command/address decoder 106 interfaces the MCU core 103 to the addressable memory (whether program memory 102 or other addressable memory, internal or external), I/O ports, and configuration registers. Some of the configuration registers, particularly those within the flash operation controller, are discussed in greater detail later. When the system 100 is operating with the MCU core 103 (as opposed to an external processor, discussed below), this is known as "normal mode".

I/O pads interface 108 includes circuitry for interfacing the various components of the system 100 to external devices (not shown), for example, external memory or an external host. Finally, test mode controller 110 assists in controlling the system 100 when it is operating in "external host mode", wherein an external "host" processor (not shown) is operating in place of the MCU core 103. An example of an external host is a PCB tester automated test equipment, a PC-controlled development board, or an OTP (one-time programmable) MCU programmer. During external host mode, in response to hardware commands decoded from control signal input pins, the system 100 performs test, erase and/or programming functions.

Figure 2:
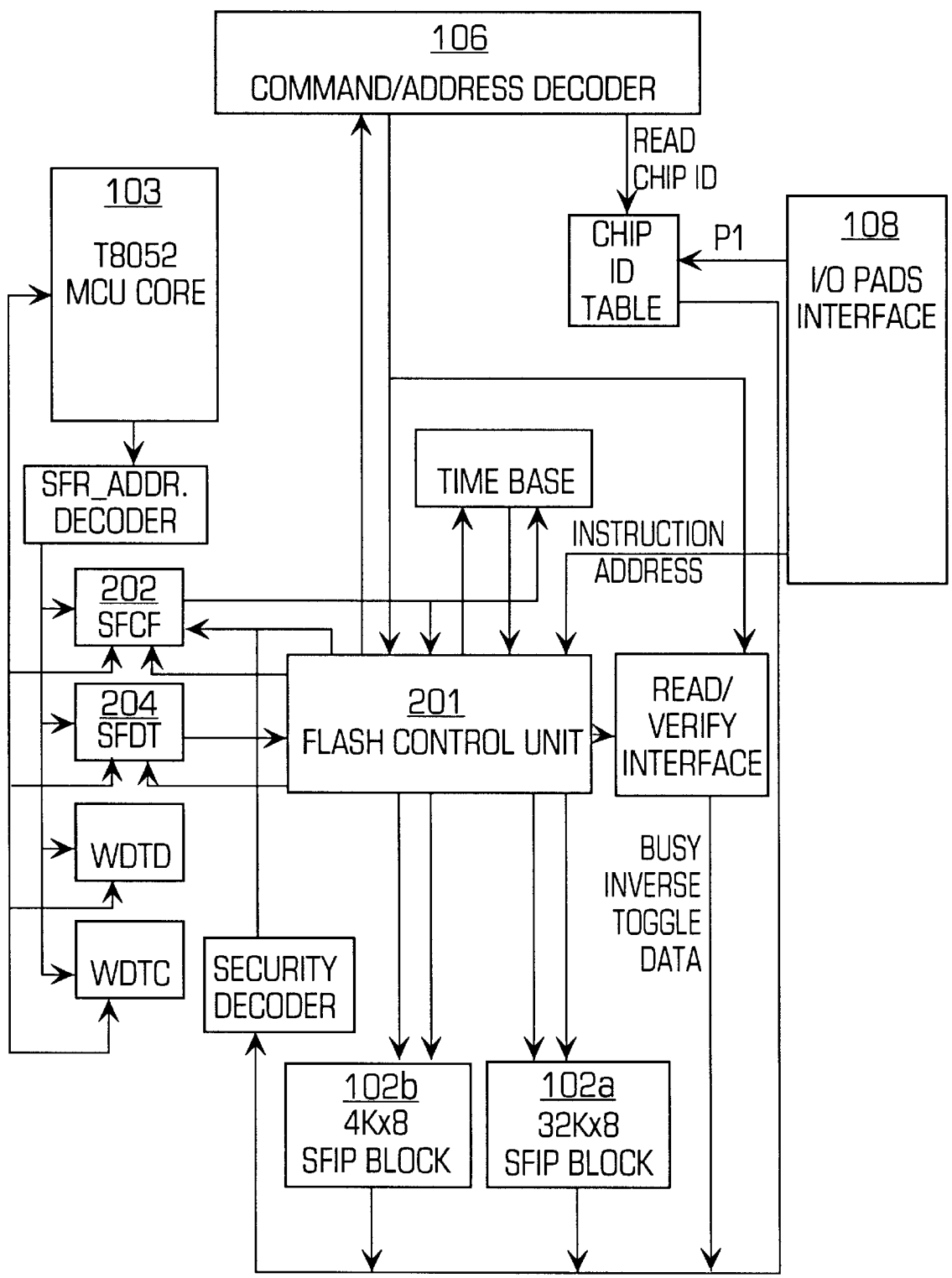
FIG. 2 is a block functional illustration of an embodiment of a flash operation controller of the FIG. 1 microcontroller system.

Security functions of the microcontroller system 100 are now discussed with reference to FIG. 2, which is a more detailed functional diagram of the flash operation controller 104. In the context of the present invention, a primary function of the flash operation controller 104 is to control read and/or write access to the blocks 102a and 102b of the program memory 102, in accordance with the value stored in a "security byte". Specifically, the flash control unit 201 controls such access responsive to the value of the security byte, as indicated by a field of the SuperFlash® Configuration register (SFCF) 202 which contains a decoding of the security byte. The security byte is located at the highest address location, FFFFh, of the microcontroller system 100 memory space. That is, the security byte is located at the highest location in upper program memory block 102b.

Depending on the value of the security byte, either the entire program memory 102 may be locked; just the upper program memory block 102b may be locked; or both the lower program memory block 102a and the upper program memory block 102b may be unlocked. (Again, the term "value of the security byte" is a shorthand notation herein for the value of the field in the SFCF register 202 that is a decoding of the security byte.) Precisely what it means for a block of memory to be "locked" or "unlocked" is discussed later. The table shown in FIG. 3A provides a summary of the effect that a particular value of the security byte has on the security functions of the system 100.

When the security byte has a value FFh, both the program memory block 102a and program memory block 102b are unlocked. When the system 100 is delivered from the factory, or after a CHIP ERASE function whereby the contents of the program memory 102 are erased and there is no need for security, the default value of the security byte is FFh.

Referring also to FIG. 3B, if the security byte value is other than FFh (i.e., has an "activated" value), then security is activated to lock at least one of the program memory blocks 102a and 102b. In this case, the "move constant" (MOVC) instruction, which in some instances could be used for read access of data from the program memory 102, is denied read access when the location of the MOVC instruction itself could be in either an unlocked flash memory location (i.e., a portion of the flash memory 102 is unlocked, as indicated by the activated value of the security byte) or may be in an external memory (as indicated by the signal at an External Enable, or EA#, input pin). Therefore, the contents of the internal flash program memory 102 are prevented from being read undesirably when any level of security is activated.

The effect of the security byte on program memory 102 programming operations (i.e., write access) is now discussed. If the system 100 is in external host mode and the security byte value is other than FFh, the following external host mode commands are not allowed on the locked program memory 102:

sector erase, to erase the addressed sector;
block erase, to erase the addressed block;
write byte, to write a byte to the addressed location;
burst write, to write an entire addressed row by burst writing sequentially within the row if the byte location has been successfully erased and not yet programmed; and
verify byte, to read a code byte from the addressed location.

The read ID function, to read the chip "signature" and identification registers, is allowed even when the security byte is not FFh.

Put simply, when the system 100 is in external host mode, only the CHIP ERASE operation, to completely erase the program memory 102, can be used to access the lockable flash memory locations. That is, the CHIP ERASE function operates regardless of the value of the security byte. As discussed above, in response to the CHIP ERASE function being executed, the security byte is set back to the default value of FFh. Then, because security is disabled, the external host may freely program (or otherwise access) the program memory 102, via the SFDT "mailbox register" 204. (The WDTD and WDTC registers shown in FIG. 2 are for controlling a watchdog timer and are not relevant to the present disclosure.)

If the security byte at location FFFFh has the value F5h, only the upper program memory block 102b is locked, and the lower program memory block 102a is not locked.

During concurrent programming mode, with the security byte at location FFFFh set to 05h, the lower program memory block 102a may be programmed (i.e., sector or block erase, write and verify operations) by program code executing from the upper program memory block 102b, but not by any program code executing from the external program code storage even though both program memory blocks 102a and 102b are security locked for any other access, such as External Mode Host Access. This security mechanism is known as "soft lock". Contrary to the "hard lock", when the security byte at location FFFFh is set to 55h (where both the upper 102b and lower 102a memory blocks are not accessible for any programming operation), the "soft lock" security mechanism allows the system to use a secure program code to perform in-system and in-field flash memory concurrent programming of the lower program memory block 102a under a predetermined secure environment. The table in FIG. 3A further illustrates this security lock feature.

More details of the program memory addressable space are now discussed with reference to FIGS. 4A to 4C, particularly relative to how the program memory organization is adaptable to address safety and security concerns. More specifically, FIGS. 4A to 4C show three program memory organization and assignment options of the microcontroller system 100.

As discussed above, the program (flash) memory 102 of the microcontroller system 100 includes two blocks, lower program memory block 102a and upper program memory block 102b.

In one embodiment, the lower program memory block 102a has 32 Kbytes, and occupies the address space 0000h to 7FFFh. The 32 Kbytes of the lower program memory block 102a are organized as 512 rows (256 of 128-byte sectors per page, 9 X-address lines) and 512 columns (64 bytes per row, 6 Y-address lines). The upper program memory block 102b has 4 Kbytes, and occupies the address space F000h to FFFFh. The 4 Kbytes of the upper program memory block 102b are organized as 128 rows (64 of 64-byte sectors per page, 7 X-address lines) and 256 columns (32 bytes per row, 5 Y-address lines).

As can be seen from FIGS. 4A to 4C, the address space 8000h to EFFFh is always reserved for external memory (not shown), which may be, for example, memory of a development system or hardware programmer.

Referring now specifically to FIG. 4B, in "normal mode", when instructions are being executed by the MCU processor core 103, the upper program memory block 102b is "hidden for code fetching". This is so even when internal code execution is enabled (#EA=1; see FIG. 3) such that code may be executed from the internal program memory 102. By "hidden for code fetching", it is meant that program instructions in the block "hidden for code fetching" cannot be fetched and executed from locations of the hidden block.

As shown in FIG. 4A, to make the upper program memory 102b visible for code fetching, so that the concurrent programming operation can be carried out by executing program instructions from the upper program memory 102b, the system 100 must be in internal mode (i.e., #EA=1), and the user must set a concurrent programming field in the Super-Flash® configuration register SFCF 202. In one embodiment, the concurrent programming field is the most significant bit of the SuperFlash® configuration register SFCF 202 (FIG. 2).

As for the visibility of the lower program memory block 102a, while internal code execution is enabled (i.e., #EA=1), the lower program memory block 102a is always visible for code fetching. This can be seen from FIGS. 4A and 4B. If the external enable is asserted at hardware reset of the system 100, program execution starts from the lower program memory block 102*a*.

Finally, as can be seen from FIG. 4C, while internal code execution is not enabled (i.e., #EA=0), both lower program memory block 102*a* and upper program memory block 102*b* are hidden for code fetching.

By having circuitry to so allocate the program memory, the security of the program memory is enhanced. Furthermore, in combination with the security lock circuitry, the security of the program is further enhanced.

Attached hereto as Appendix A is the "SST89C58 Data Sheet" which is to be considered an integral part of this specification.

What is claimed is:

1. A unitary integrated memory circuit comprising:
   a first block of nonvolatile programmable memory, having an addressable first memory space, and a second block of nonvolatile programmable memory, having an addressable second memory space;
   a storage for storing a security code; and
   memory space allocation circuit responsive to said security code, causing said integrated memory circuit to be operable in one of a plurality of the following modes:
      first mode, wherein said first block of nonvolatile programmable memory and second block of nonvolatile programmable memory are prevented from being written by commands external to said integrated memory circuit;
      second mode, wherein said first block of nonvolatile programmable memory and second block of nonvolatile programmable memory are prevented from being written by commands external to said integrated memory circuit, but said second block of nonvolatile programmable memory can be written based upon execution of commands stored in said first block of nonvolatile programmable memory.

2. The unitary integrated memory circuit of claim 1 wherein said storage is in said addressable first memory space.

3. The unitary integrated memory circuit of claim 1 wherein said first block of nonvolatile programmable memory and said second block of nonvolatile programmable memory are flash memories.

4. The unitary integrated memory circuit of claim 3 wherein in said first mode, said first block of nonvolatile programmable memory and said second block of nonvolatile programmable memory can be erased only by the erasure of the entire blocks of memory, and is otherwise not erasable by commands external to said integrated memory circuit.

5. The unitary integrated memory circuit of claim 1 further comprising:
   a processor;
   and wherein said unitary integrated memory circuit is operable in an internal mode wherein said processor retrieves program instructions stored in said first or second block of nonvolatile programmable memory and executes same.

6. The unitary integrated memory circuit of claim 5 wherein said memory space allocation circuit is further responsive to said security code in a third mode such that said processor is prohibited from retrieving program instructions from said first block of nonvolatile programmable memory; and said processor may retrieve program instructions from said second block of nonvolatile programmable memory.

7. The unitary integrated memory circuit of claim 6 wherein said memory space allocation circuit is further responsive to said security code in a fourth mode such that said processor may retrieve program instructions from said first block of nonvolatile programmable memory; and said processor may retrieve program instructions from said second block of nonvolatile programmable memory.

8. A unitary integrated memory circuit comprising:
   a processor;
   a first block of programmable memory, having an addressable first memory space, and a second block of programmable memory, having an addressable second memory space;
   a storage for storing a security code; and
   memory space allocation means responsive to said security code, causing said integrated memory circuit to be operable in one of a plurality of the following modes:
      first mode, wherein said first block of programmable memory and second block of programmable memory are prevented from being written by commands external to said integrated memory circuit;
      second mode, wherein said first block of programmable memory and second block of programmable memory are prevented from being written by commands external to said integrated memory circuit, but said second block of programmable memory can be written based upon execution of commands stored in said first block of programmable memory; and
      third mode, wherein program instructions from said first block of programmable memory is prevented from being retrieved by said processor, and program instructions from said second block of programmable memory may be retrieved by said processor.

9. The unitary integrated memory circuit of claim 8 wherein said memory space allocation means is further responsive to said security code in a fourth mode such that said processor may retrieve program instructions from said first block of programmable memory; and said processor may retrieve program instructions from said second block of programmable memory.

10. The unitary integrated memory circuit of claim 9 wherein said first and second blocks of programmable memory are flash memories.

11. The unitary integrated memory circuit of claim 10 wherein said storage is in said addressable first memory space.

* * * * *